United States Patent Office 3,318,913
Patented May 9, 1967

3,318,913
PROCESS FOR PRODUCING ALPHA-METHYL-GAMMA-BUTYROLACTONE
Jurgen F. Falbe, Bonn, Germany, and Nicolaas Huppes, Amsterdam, Netherlands, assignors to Shell Oil Company, New York, N.Y., a corporation of Delaware
No Drawing. Filed Feb. 18, 1966, Ser. No. 528,384
Claims priority, application Germany, Sept. 22, 1965, S 99,580
6 Claims. (Cl. 260—343.6)

This invention relates to an improved method for the production of α-methyl-γ-butyrolactone.

Methods for the production of lactones by hydroformylation of alkenoic acid esters are known in the art. For example, Bowditch et al., U.S. 2,817,669 issued Dec. 24, 1957, describe the production of a product containing delta-valerolactone by the hydroformylation of ethyl crotonate in the presence of a cobalt oxide catalyst of particular particle size. The German patent of Falbe et al. No. 1,186,041, issued Jan. 28, 1965, describes a related process employed tetracarbonylcobalt hydride as the catalyst.

It is an object of the present invention to provide an improved method for the hydroformylation of lower alkyl esters of alkenoic acids. More particularly it is an object to provide an improved process for the production of α-methyl-γ-butyrolactone.

It has now been found that these objects are accomplished by the process of initially contacting a lower alkyl ester of methacrylic acid with carbon monoxide and hydrogen in the presence of a rhodium-containing catalyst and subsequently hydrogenating and lactonizing the product resulting therefrom.

The methacrylate ester reactant employed in the process of the invention is a lower alkyl ester of methacrylic acid represented by the formula

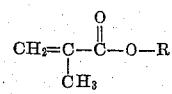

wherein R is an alkyl group. Although the success of the present invention is not dependent upon an particular alkyl moiety of the methacrylate ester, best results are obtained when a lower alkyl methacrylate is employed, for example, an ester of the above formula wherein R is alkyl of up to 3 carbon atoms, i.e., methyl, ethyl or propyl. Particularly preferred as the ester reactant is methyl methacrylate.

To effect hydroformylation, the ester reactant is contacted with carbon monoxide and hydrogen. No special precautions are required with regard to these materials and commercially available grades are satisfactory. The molar ratio of carbon monoxide to hydrogen is not critical and molar ratios from about 4:1 to about 1:4 are satisfactorily employed. Generally preferred, however, are molar ratios from about 2:1 to about 1:2. The hydrogen and carbon monoxide are suitably charged to the reaction system as such although it is also useful to employ commercial mixtures of these gaseous reactants, e.g., synthesis gas.

The catalyst is a rhodium carbonyl catalyst optionally modified by the presence of tertiary amine. In one modification, the rhodium-containing catalyst is employed in the substantial absence of complexing ligands other than carbonyl. The rhodium carbonyl is suitably introduced as a preformed material or is formed in situ by reaction of some other form of rhodium with the other reaction mixture components. Thus, the rhodium is provided as the metal, or as the salt of an organic or inorganic acid, e.g., rhodium chloride, rhodium nitrate, rhodium napthenate or rhodium octanoate. In yet another and frequently preferred modification, the rhodium is introduced in the form of the oxide, $Rh_2O_3$. Although the precise catalytically active species is not known with certainty, it is considered that regardless of the form in which the rhodium is provided, reaction with the carbon monoxide and/or the hydrogen present in the reaction system results in the formation of a rhodium carbonyl catalyst.

In the preferred modification of the invention, the rhodium carbonyl catalyst is modified by the presence of tertiary amine. Amines that are employed as catalyst modifiers are preferably hydrocarbon monoamines of up to 20 carbon atoms which are free from aliphatic unsaturation. Illustrative of such tertiary amines are trialkyl amines including trimethylamine, triethylamine, dimethyllauryl amine, methylethyloctylamine and dibutyldecylamine; aromatic amines such as dimethylaniline, triphenylamine, ethyldi(tolyl)amine, dimethylnaphthylamine and dipropylaniline; and heterocyclic amines including pyridine, picoline, lutidine, N-methylpyrrolidine and N-octylpyrrolidine. When present, amounts of tertiary amine up to about 10% by weight based upon the methacrylic acid ester are satisfactory. As previously stated, no tertiary amine is required, but best results are obtained when at least 0.01% by weight based on the methacrylate ester of tertiary amine is present in the reaction mixture.

The rhodium is employed in catalytic quantities, preferably in amounts from about 0.0001 gram-atom to about 0.01 gram-atom per mole of methacrylate ester and particularly in amounts from about 0.0004 gram-atom to about 0.004 gram-atom per mole of methacrylate ester.

The hydroformylation process is conducted in an inert solvent and solvents which are liquid at reaction temperature and pressure and are inert to the reactants as well as the lactone product are suitably employed. Illustrative solvents include ethers such as dibutyl ether, dioctyl ether, anisole and diphenyl ether; and esters such as methylbenzoate, diethylphthalate and hexylbutyrate. Preferred inert solvents are hydrocarbons free from aliphatic unsaturation such as benzene, toluene, cyclohexane, decahydronaphthalene, dodecane and heptane. The amount of solvent is not critical but typically weight ratios of solvent to methacrylate ester from about 1:1 to about 6:1 are employed.

The process of α-methyl-γ-lactone production comprises initially contacting the methacrylate ester reactant with hydrogen and carbon monoxide in the presence of the rhodium catalyst and subsequently hydrogenating the initial hydroformylation product. The temperature at which the initial hydroformylation is conducted is somewhat critical and temperatures from about 120° C. to about 180° C. provide better results than temperatures which are either higher or lower. Particularly preferred are temperatures from about 140° C. to about 180° C. The initial reaction is conducted at superatmospheric pressure and pressures from about 75 atmospheres to about 1000 atmospheres are satisfactory; particularly suitable are pressures from about 150 atmospheres to about 500 atmospheres. The reactants and catalyst are contacted in any convenient manner. In one process modification, the ester reactant, solvent and catalyst are charged to an autoclave or similar reactor which is then pressurized with the gaseous reactants. In an alternate modification, the reactants and catalyst are contacted in a continuous operation as by effecting the contacting during passage through an elongated reactor.

At the conclusion of the hydroformylation reaction, the initial hydroformylation product comprises a β-formylisobutyrate ester corresponding to the methacrylate ester reactant. To produce the desired lactone product, the β-formylisobutyrate ester is subsequently hydrogenated and lactonized.

In one modification, the hydrogenation and lactonization are conducted as a separate operation after isolation of the hydroformylation product mixture. At the conclusion of the hydroformylation procedure the reactor is cooled and vented and the rhodium catalyst is removed by conventional methods as by filtration, centrifugation or water washing. The hydroformylation product is then contacted with molecular hydrogen in the presence of a conventional hydrogenation catalyst.

Illustrative conventional hydrogenation catalysts include Group VIII transition metals such as platinum, palladium, nickel and cobalt or metal oxide catalysts such as palladium oxide, platinum oxide and copper chromite. Suitable temperatures for the separate hydrogenation process are from about 20° C. to about 250° C. when employed in conjunction with hydrogen pressures from about 1 atmosphere to about 400 atmospheres. To facilitate lactone formation it is preferred that hydrogenation temperatures of at least 180° C., e.g., a temperature from about 180° C. to about 210° C., be employed, and at these temperatures the hydroxy-ester initially formed by hydrogenation undergoes spontaneous cyclization to the desired α-methyl-γ-butyrolactone.

In the preferred modification of the process, however, the hydrogenation is conducted without separating the initial hydroformylation product from the rhodium catalyst. In this modification, at the conclusion of the initial hydroformylation the temperature is raised to at least 180° C. but no higher than about 250° C., preferably no higher than about 210° C., and the hydrogen component of the initial product mixture serves to effect the desired hydrogenation. It is seldom necessary to alter the pressure of hydrogen in the system although the hydrogen pressure at which hydrogenation is conducted should be at least 100 atmospheres and additional hydrogen is added if required. There is no critical limitation on the maximum hydrogen pressure used, and the hydrogen pressure may be as high as 2000 atmospheres or higher. The presence in the reaction system of unreacted carbon monoxide does not appear to be detrimental, the carbon monoxide serving only as an inert diluent. As previously stated, when hydrogenation is conducted at 180° C. or higher, spontaneous lactonization takes place, upon hydrogenation, to afford the desired lactone product.

The preferred method of operation, i.e., conducting the hydrogenation without separation of the initial product mixture, offers a substantial advantage with regard to catalyst separation and recovery. At the conclusion of reaction the pressure is released when the product mixture is cooled, whereupon the rhodium catalyst decomposes and is deposited as a powder in substantially quantitative yield. The rhodium is easily recoverable, as by filtration, and may be recycled without further treatment. Under similar conditions, cobalt catalysts form cobalt mirrors and encrustations and considerable difficulty is obtained in reusing such cobalt residues. The α-methyl-γ-butyrolactone product is separated from the product mixture by conventional procedures as by fractional distillation, selective extraction, fractional crystallization and the like.

The α-methyl-γ-butyrolactone product is useful as a high-boiling polar solvent and as a heat transfer medium. The lactone is polymerized to form a polyester useful in fiber production and is reacted with substituted anilines to form corresponding lactams which are useful as herbicides.

To further illustrate the improved process of the invention, the following examples are provided. It should be understood that the details thereof may be varied as will be understood by one skilled in this art.

*Example I*

A series of runs was made in which methyl methacrylate was charged to a reactor together with rhodium oxide and, in some cases, a tertiary amine catalyst modifier. The reaction solvent was benzene in all cases except Run 12 wherein diphenyl ether was used. The mixture was contacted with an equimolar mixture of carbon monoxide and hydrogen under the conditions designated "a" in each run of the table. After the indicated reaction time, the temperature of the mixture was raised and the mixture was hydrogenated under the conditions designated "b." Upon completion of hydrogenation the reactor was cooled and vented and the catalyst decomposition products were removed by filtration. The solvent was then removed by distillation and the resulting mixture was distilled at reduced pressure to afford the indicated yield of α-methyl-γ-butyrolactone, which yield is calculated on the basis of methyl methacrylate charged. For purposes of comparison, Runs 1 and 2 were conducted at hydroformylation temperatures outside the scope of the invention. The results of this series are shown in Table I.

TABLE I

| Run | Methyl methacrylate, g. | Solvent, g. | $Rh_2O_3$, g. | Temp., °C. | Pressure, atm. | Reaction time, hrs. | Yields of α-methyl-γ-butyrolactone |
|---|---|---|---|---|---|---|---|
| 1 | 200 | 80 | 0.2 | (a) 80 / (b) 230 | (a) 200 / (b) 300 | (a) 7 / (b) 4 | 82 g. 41%. |
| 2 | 100 | 200 | 0.2 | (a) 100 / (b) 230 | (a) 200 / (b) 300 | (a) 3.5 / (b) 1.5 | 38 g. 38%. |
| 3 | 200 | 800 | 0.2 | (a) 130 / (b) 300 | (a) 200 / (b) 300 | (a) 6 / (b) 2 | 125.8 g. 63%. |
| 4 | 200 | 800 | 0.2 | (a) 150 / (b) 230 | (a) 200 / (b) 300 | (a) 3 / (b) 1 | 120.7 g. 60.4%. |
| 5 | 100 | 400 | 0.2 | (a) 150 / (b) 230 | (a) 1,000 / (b) 1,000 | (a) 1.5 / (b) 3 | 70.7 g. 70.7%. |
| 6 | 100 | 400 | 0.1 | (a) 150 / (b) 230 | (a) 400 / (b) 400 | (a) 1.25 / (b) 3 | 58 g. 58%. |
| 7 | 100 | 400 | 0.1+5 g. pyridine | (a) 130 / (b) 190 | (a) 200 / (b) 300 | (a) 1.5 / (b) 5 | 59 g. 59%. |
| 8 | 200 | 800 | 0.2+10 g. N-ethylpyrrolidine | (a) 130–150 / (b) 210 | (a) 200 / (b) 300 | (a) 1 / (b) 3.5 | 150 g. 75%. |
| 9 | 100 | 400 | 0.1+5 g. pyridine | (a) 160 / (b) 230 | (a) 200 / (b) 300 | (a) 1 / (b) 2 | 79 g. 79%. |
| 10 | 200 | 800 | 0.2+10 g. pyridine | (a) 130 / (b) 190 | (a) 200 / (b) 300 | (a) 1.5 / (b) 5 | 140 g. 70%. |
| 11 | 250 | 250 | 0.2+5 g. pyridine | (a) 160 / (b) 230 | (a) 200 / (b) 300 | (a) 1 / (b) 2.5 | 185 g. 74%. |
| 12 | 200 | 200 | 0.2+5 g. pyridine | (a) 160 / (b) 230 | (a) 200 / (b) 300 | (a) 2 / (b) 3 | 162 g. 81%. |
| 13 | 100 | 400 | 0.1+5 g. N-lauryl pyrrolidine | (a) 160 / (b) 230 | (a) 200 / (b) 300 | (a) 0.8 / (b) 1 | 160 g. 80%. |
| 14 | 200 | 800 | 0.1+2.5 g. 2-butyl-3,5-dipropyl pyridine | (a) 160 / (b) 230 | (a) 200 / (b) 300 | (a) 6 / (b) 5 | 76 g. 76%. |

Example II

By a procedure similar in part to that of Example I, 400 g. of methyl methacrylate, 400 g. of benzene, 0.2 g. of rhodium oxide and 5 g. of pyridine were charged to a reactor. The reaction mixture was maintained at 160° C. and an initial hydrogen-carbon monoxide (molar ratio of 1:1) pressure of 200 atmospheres. After a reaction time of two hours, the reactor was cooled and vented and the catalyst decomposition product was removed by filtration. The product mixture was then contacted with hydrogen at a temperature of 200° C. and a pressure of 20 atmospheres in the presence of a Raney nickel catalyst for a period of two hours. The α-methyl-γ-butyrolactone product was then recovered according to the procedure of Example I. The yield of lactone was 336 g. which represents 84% of theory.

Example III

A series of runs was made in which methyl methacrylate was contacted with an equimolar mixture of carbon monoxide and hydrogen in the presence of 0.1 g. of rhodium oxide and in the absence or presence of various tertiary amines. In each case, 100 g. of methyl methacrylate in 400 g. of benzene was employed and the reaction temperature and pressure were 160° C. and 200 atmospheres respectively. The results of this series are shown in Table II wherein the heading "Time" refers to the hours required for 100% conversion of the ester reactant and the heading "Yield" refers to the yield of methyl β-formylisobutyrate.

TABLE II

| Run | Amine, g. | Time | Yield, Percent |
|---|---|---|---|
| 1 | None | 3 | 61 |
| 2 | Pyridine, 0.5 | 7.5 | 70 |
| 3 | 2-butyl-3,5-dipropylpyridine, 0.5 | 6 | 76 |
| 4 | Triethylamine, 1 | 2 | 76 |
| 5 | Pyridine | 1 | 79 |

Example IV

To an autoclave was charged 0.1 g. of rhodium oxide, 20 g. of pyridine and 500 ml. of benzene. After the reactor had been heated to 165° C. and pressurized with a 2:1 mixture of hydrogen and carbon monoxide to a pressure of 200 atmospheres, a solution of 1 kg. of methyl methacrylate in 1.5 kg. of benezne was charged to the reactor over a 3 hour period. After an additional 2 hour period during which the same conditions were maintained, the temperature was raised to 200° C. while the pressure was maintained at 200 atmospheres. After 2.7 hours the product mixture was separated according to the procedure of Example I. The yield of α-methyl-γ-butyrolactone, B.P. 200–201° C., $n_D^{20}$ 1.4332, was 776 g. which represents 78% of theory.

We claim as our invention:

1. The process of producing α-methyl-γ-butyrolactone which comprises initially intimately contacting (a) lower alkyl ester of methacrylic acid, (b) carbon monoxide, and (c) from about 0.25 mole to about 4 moles of hydrogen per mole of carbon monoxide, in liquid-phase solution in inert solvent in the presence of from about 0.0001 gram-atom to about 0.01 gram-atom of rhodium catalyst per mole of the methacrylate ester and up to about 10% by weight based on the methacrylate ester of a tertiary amine at a temperature from about 120° C. to about 180° C. and a pressure of from about 75 atmospheres to about 1000 atmospheres; and subsequently maintaining the resulting mixture at a temperature from about 180° C. to about 250° C., thereby hydrogenating and lactonizing the β-formylisobutyrate ester product resulting from said initial intimate contacting.

2. The process of claim 1 wherein the amount of said tertiary amine is at least 0.01% by weight based on the methacrylate ester.

3. The process of claim 2 wherein the tertiary amine is a heterocyclic tertiary monoamine of up to 20 carbon atoms.

4. The process of claim 3 wherein the tertiary amine is pyridine.

5. The process of claim 1 wherein the rhodium is provided as rhodium oxide.

6. The process of claim 1 wherein the lower alkyl ester of methacrylic acid is methyl methacrylate.

References Cited by the Examiner

UNITED STATES PATENTS

| | | | |
|---|---|---|---|
| 2,817,669 | 12/1957 | Bowditch et al. | 260—343.5 |
| 2,880,241 | 3/1959 | Hughes | 260—472 X |
| 3,176,038 | 3/1965 | Zachry et al. | 260—485 |

ALEX MAZEL, *Primary Examiner.*

JOSEPH A. NARCAVAGE, *Assistant Examiner.*